United States Patent [19]

Suzuki

[11] Patent Number: 4,989,195
[45] Date of Patent: Jan. 29, 1991

[54] DISK RECORDING/REPRODUCING SYSTEM USING DISK IDENTIFICATION SIGNAL TO RETRIEVE STORED CONTROL PARAMETERS

[75] Inventor: Tsutomu Suzuki, Saitama, Japan

[73] Assignee: Pioneer Electronic Corporation, Tokyo, Japan

[21] Appl. No.: 201,157

[22] Filed: Jun. 2, 1988

[30] Foreign Application Priority Data

Jul. 8, 1987 [JP] Japan ............... 62-171550

[51] Int. Cl.⁵ .................. G11B 15/52; G11B 27/22
[52] U.S. Cl. .................................................. 369/50
[58] Field of Search .................. 369/47–48–49, 369/50, 33

[56] References Cited

U.S. PATENT DOCUMENTS

| 4,688,203 | 8/1987 | Koishi et al. | 369/111 X |
| 4,698,695 | 10/1987 | Kosaka et al. | 369/50 |
| 4,766,502 | 8/1988 | Mashimoto | 369/50 X |
| 4,800,550 | 1/1989 | Yamauchi | 369/47 |
| 4,872,151 | 10/1989 | Smith | 369/48 X |
| 4,896,311 | 1/1990 | Ishihara | 369/47 |

FOREIGN PATENT DOCUMENTS

| 37-282503 | 4/1962 | Japan . | |
| 51-55563 | 4/1982 | Japan | 369/33 |
| 59-42653 | 3/1984 | Japan | 369/275 |
| 59-60742 | 4/1984 | Japan | 369/54 |
| 59-215076 | 12/1984 | Japan | 369/33 |
| 60-113361 | 6/1985 | Japan | 369/47 |
| 60-160082 | 8/1985 | Japan | 369/292 |
| 60-237679 | 11/1985 | Japan | 360/69 |

OTHER PUBLICATIONS

English Translation of JP60-237679.
English Transl. of JP60-160082.
English Transl. of JP 59-60742.

Primary Examiner—Donald McElheny, Jr.
Attorney, Agent, or Firm—Sughrue, Mion, Zinn, Macpeak & Seas

[57] ABSTRACT

A recording/reproducing system for use with a plurality of different types of disks, each of the disks having an identification signal recorded thereon which uniquely identifies one of the different types of disks. The system includes a disk drive for driving a disk, a control circuit for receiving the identification signal and for controlling the disk drive. The system also includes a memory for storing a plurality of operating conditions for the disk drive. The plurality of operating conditions are arranged in the memory such that each of the different types of disks has a corresponding set of operating conditions. The control circuit reads from the memory that set of operating conditions corresponding to the idenfied type of disk, and controls the disk drive according to the read set of operating conditions.

10 Claims, 3 Drawing Sheets

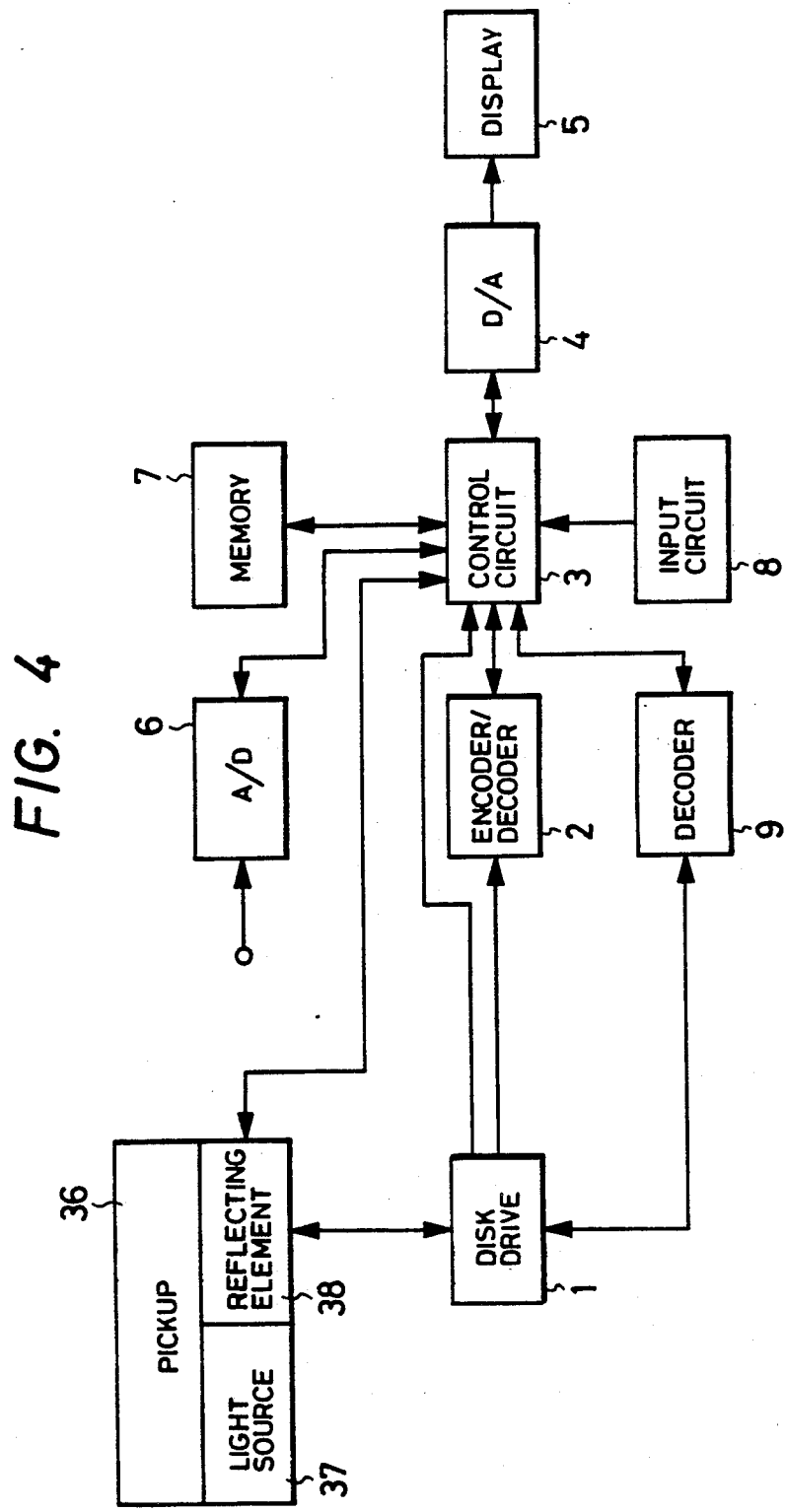

DISK RECORDING/REPRODUCING SYSTEM USING DISK IDENTIFICATION SIGNAL TO RETRIEVE STORED CONTROL PARAMETERS

FIELD OF THE INVENTION

The present invention relates to a disk recording/reproducing system suitable for use in optical disk units or the like.

Recently, compact disks, optical disks and the like have become popular. Previously, these disks were solely used as a read-only memory, as information that had been previously recorded could not be erased, and therefore users could not record any information onto these disks.

BACKGROUND OF THE INVENTION

Generally, optical disks use easily fusible or sublimatable metal or pigment as the information recording material Information is recorded on these recording materials by irradiating the recording material with a laser light to form pits. The information recorded on these different types of recording materials can be reproduced, but it cannot be erased. More specifically, it is not possible to record information on a track of a disk having information previously recorded on that same track, although it is possible to record information on other tracks of the disk which have no information recorded thereon.

On the other hand, optical disks formed of an amorphous or of a photomagnetic recording material Which have information recorded thereon by, for example phase change Kerr effect or the like, have an advantage in that not only is it possible to reproduce information previously recorded on the disk, but it is also possible to erase information recorded on the disk for rewriting new information on that disk.

As described above, optical disks used for optically recording/reproducing information by irradiating a laser light and the like on the disk can be classified into three different types. More specifically, optical disks can be classified into a first disk of the read-only type, a second disk of the nonerasable read/write type, and a third disk of the erasable read/write type.

In recording or reproducing information onto or from a disk, the optimum intensity of the laser light used for recording or reproducing varies according to the type of disk. Further, the reflectivity of a disk also varies according to the type of disk. Accordingly, it is necessary to adjust the AGC corresponding to the particular type of disk.

In previous conventional systems, a plurality of data or information representing the type of disk, the optimum light intensity, the reflectivity of the disk and the like, have been recorded on a predetermined position of the disk in advance, so that this data can be read before a recording/reproducing operation is initiated. This data is used to establish respective operating conditions of the system corresponding to the data.

According to the aforementioned conventional system, data for establishing different operating conditions of the system must be separately recorded on each disk. Data relating to the optimum light intensity for use in recording and erasing operations have not been recorded on disks of the read-only type, since this data has no use in read-only type disks. Therefore, data relating to the optimum light intensity for use in recording and erasing operations has only been recorded on the erasable read/write type of disks. As discussed above, the operating conditions of a disk varies according to the type of disk. Heretofore, this has been a barrier in providing a single recording/reproducing unit or disk drive which can record/reproduce information from/onto different types of disks.

SUMMARY OF THE INVENTION

It is therefore an object of the present invention to provide a novel system in which a single recording/reproducing unit can be used for a plurality of different types of disks.

The foregoing object, and other objects of the invention are realized by the present invention which provides a recording/reproducing system for a disk having a control track carrying an identification signal recorded thereon which is used to determine a set of operating conditions required when information is recorded/reproduced onto/from a particular type of disk. The system includes a disk recording/reproducing unit; and a memory for storing, in table form, different sets of operating conditions, with each set of operating conditions corresponding to one of the plurality of different types of disks identified by the identification signal.

Consequently, identification signals having a common format can be used in disks of different types, thereby making it possible to record/reproduce information onto/from any one of the different types of disk by a single recording/reproducing unit.

BRIEF DESCRIPTION OF THE DRAWINGS

FIG. 4 is a block diagram showing an embodiment of the invention.

DETAILED DESCRIPTION OF THE PREFERRED EMBODIMENT

Figure 1A:
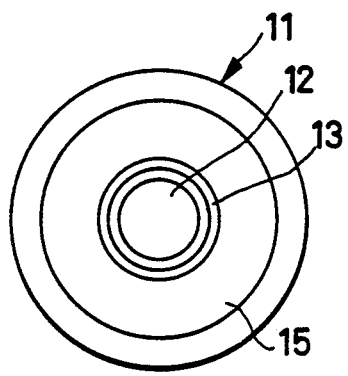
FIGS. 1(a), 1(b) and 1(c) are plan views of optical disks according to the present invention.
Figure 1B:
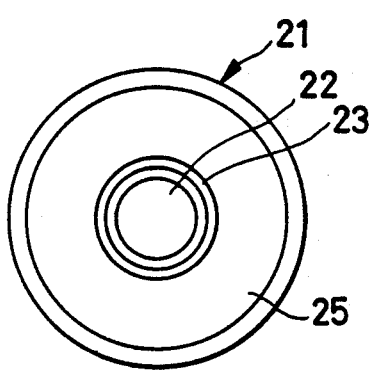
Figure 1C:
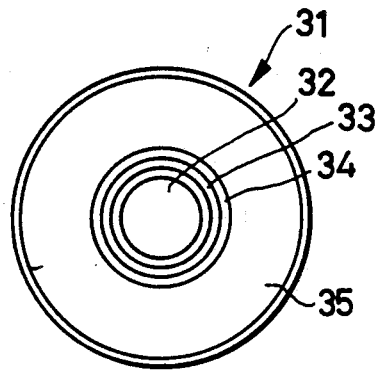

FIGS. 1(a)–(c) show plan views of optical disks according to the present invention. In FIGS. 1(a)–1(c), reference numerals 11, 21 and 31 designate a first disk of the read-only type, a second disk of the nonerasable read/write type and a third disk of the erasable read/write type, respectively.

In the erasable read/write type of disk 31 (FIG. 1(c)), a control track is formed in a control area 33 having a predetermined width (for example, 0.5 mm). The control track is provided near a center hole 32 of the disk. In addition, a checking area 34, for recording data necessary for a manufacturer's checking information, such as the date of production, factory name, and the like, is formed outside of the control area 33. Finally, a user's area 35 formed outside of the checking area 34, is provided for allowing users to arbitrarily record/reproduce information.

The nonerasable read/write type of disk 21, is similar to disk 31 in that it contains a control area 23 in Which a control track is provided near a center hole 22 of disk 21, and in that a user's area 25 is provided outside of the control area 23. However, unlike disk 31, disk 21 contains no checking area. The checking area 34 is an optional area and is provided when necessary.

The read-only type of disk 11 (FIG. 1(a)) is similar to disk 21 in that it contains a control area 13 provided near a center hole 12, and a user's area 15 provided outside of the control area 13, and in that it contains no checking area. As indicated above, a checking area is an optional area.

Another control area may be provided outside of the user area so that either of the control areas can be used according to particular circumstances.

The three types of disks 11, 21 and 31 are arranged such that each can be driven by a single disk drive unit. For example, all of the disks 11, 21 and 31 have substantially the same internal diameter, (the center holes 12, 22 and 32 are all of the same size) and all the disks have substantially the same external diameter (although the disks need not always have the same external diameter). In addition, the control areas 13, 23 and 33 of the disks are formed at the same position of the respective disks.

The user's areas 15, 25 and 35 may be formed of different recording materials, or these areas may be formed of the same recording material More particularly, the material for each user's area may be suitably selected from a read-only material, a nonerasable read/write material, or an erasable read/write material. For example, the user's area may be formed of an erasable read/write material although the disk may only be used as a read-only type of disk or as a nonerasable read/write type of disk.

Figure 2:
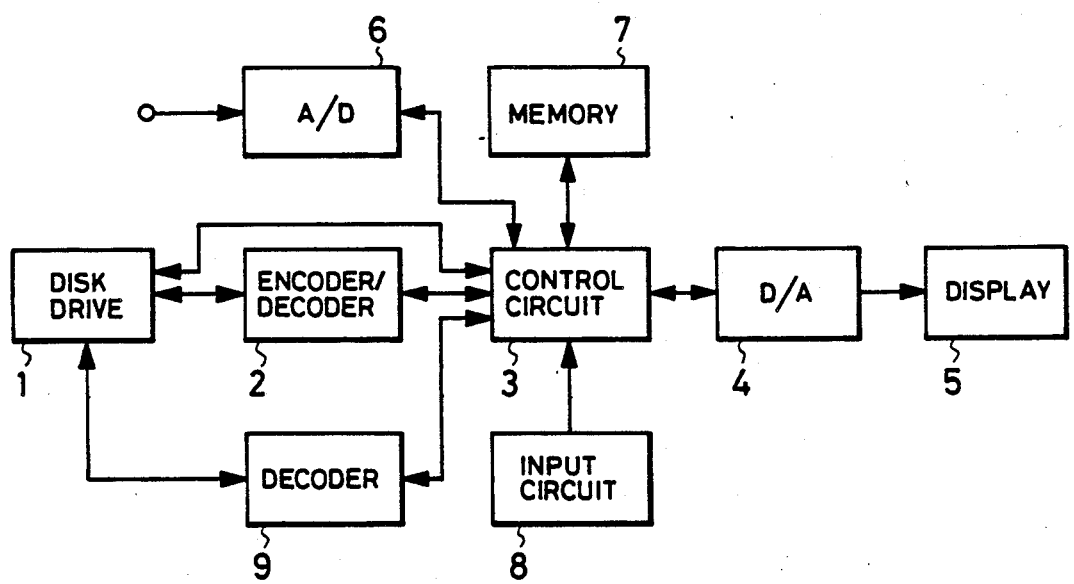
FIG. 2 is a block diagram of an optical information recording/reproducing unit according to the invention.

Referring to FIG. 2, there is shown a block diagram of a unit for recording/reproducing information onto/from the aforementioned disks. The recording/reproducing unit includes: a disk drive 1 for driving the disks 11, 21 and 31; an encoder/decoder 2 for encoding or decoding a signal to be recorded or to be reproduced a control circuit 3 (which may be a microcomputer or the like); a D/A conversion circuit 4 for converting a digital signal to an analog signal; an indicating or display circuit 5, such as a speaker, a CRT, or the like, for displaying the output of the D/A converting circuit 4; an A/D conversion circuit 6 for converting an analog signal to a digital signal; a memory 7, such as a ROM or the like, for storing necessary information; an input circuit 8 for inputting instructions to the control circuit 3; and a decoder 9.

Figure 3:
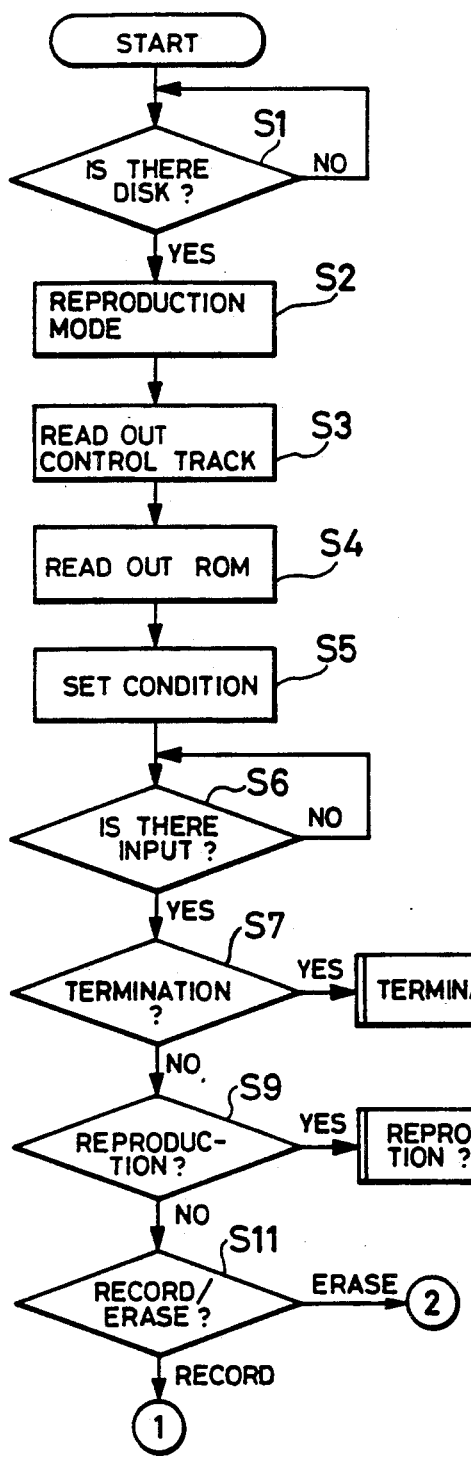
FIG. 3 is a flow chart showing the operation of the recording/reproducing unit of FIG. 2.
Figure 3:
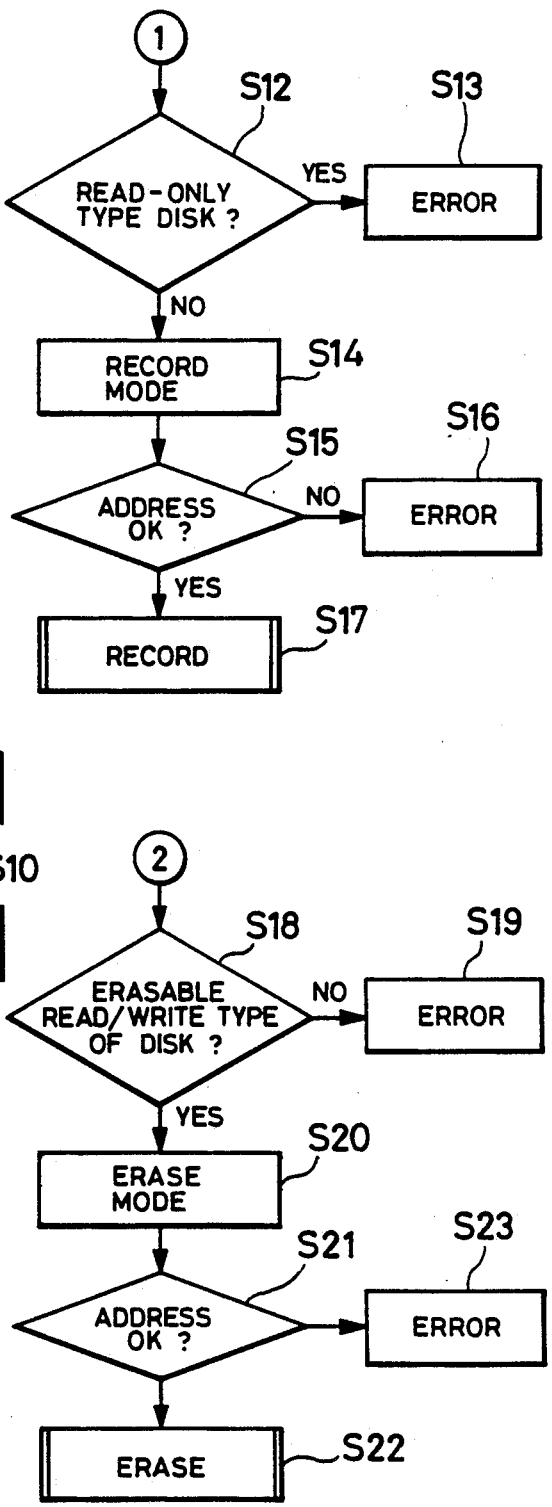

The operation of the system of FIG. 2 is shown in the flow chart of FIG. 3. Referring now to FIG. 2 and steps (S1)–(S23) of FIG. 3, when the disk is set in the drive 1, a detection signal is sent from the disk drive 1 to the control circuit 3 (S1). In response to the detection signal, the control circuit 3 sends a control signal to the disk drive 1 in order to set the operation mode to reproduction (S2). The disk drive 1 drives the disk set therein so that predetermined data is reproduced from the control track of the disk (S3).

During the production of disks, i.e., prior to delivery of the disks to users, an identification signal which uniquely identifies one of the different types of disk, is recorded on the control track of each disk. The format and the method of modulation of the identification signal are the same for all of the disks 11, 21 and 31.

The decoder 9 decodes the identification signal from the control track in accordance with the format and the method of modulation of the identification signal. After the control circuit 3 reads the identification signal from the output of the decoder 9 it then begins to read conditions (data) previously stored, in table form, from the memory 7 (S4), to thereby control respective circuits and means so as to establish proper operating conditions of the identified disk.

The aforementioned operation is automatically executed whenever a disk is set in the disk drive 1.

The control circuit 3 then Waits for an instruction Which will be input from the input circuit 8 (S6). When a termination instruction is received by circuit 3, a termination routine (S8) is executed so that the operation of the system is terminated. and the disk is ejected (or is ready to be ejected) from the disk drive 1.

When an instruction of reproduction is received by circuit 3 (S9), a reproduction routine is executed (S10). By this time, the intensity of laser light in the drive 1 has been set to a value read from the memory 7 in response to the identification signal of the disk. Information reproduced from the user's area of the disk is then sent from the disk drive 1 to be decoded by the encoder/decoder 2, and then read by the control circuit 3. If necessary, the information is sent to the D/A conversion circuit 4 through the control circuit 3 and displayed by the display circuit 5 after D/A conversion.

When a recording instruction is input (S11), the control circuit 3 first checks the data read from the memory 7 to determine the disk type (S12). If the disk set in the disk drive 1 is of the read-only type, then recording cannot be executed. Accordingly, the control circuit 3 sends a signal to the display circuit 5 through the D/A conversion circuit 4 to display an input error (S13). Further, a control signal may be sent to the disk drive unit 1 to eject the disk.

On the other hand if the disk set in the disk drive 1 is of the nonerasable read/write type, or of the erasable read/write type, then control circuit 3 sets the operation mode of the system to recording (S14). Further, the address in which information is to be recorded is judged or determined (S15). If the recording track is not in the user's area, an error procedure is carried out in the manner described above (S16) When information is to be recorded in the user's area, a recording routine is executed (S17). More specifically, an analog recording signal is sent to the A/D conversion circuit 6 where it is converted to a digital signal. The digital recording signal from circuit 6 is then sent to the encoder/decoder 2 through the control circuit 3. The encoder/decoder 2 decodes the signal according to a predetermined format and method. The output of the encoder/decoder 2 is then supplied to the disk drive 1, where it is recorded in the user's area of the disk. In this operation mode, the intensity of laser light used in the disk drive 1 has already been determined from a corresponding value read from the memory 7.

Those skill in the art will understand that the encoder/decoder 2 may be different from the decoder 9 in format and in the encoding method, or preferably, the encoder/decoder 2 may be identical to the decoder 9 in format and in the encoding/decoding method. In the case where they are identical, the decoder 9 and the encoder/decoder 2 may be provided as a single device.

When an instruction of erasing is input to circuit 8 (S11), an error procedure is carried out (S19) only if the disk in the disk drive 1 is not of the erasable read/write type (S18). In the case where the disk is of the erasable read/write type, then the operation mode of the system will be set to an erasing mode (S20). However, if the ordered address is not in the user's area, the above-described error procedure is carried out (23). If the ordered address is in the user's area (S21), then an erasing routine is executed (22) with the intensity of laser light that has been previously determined from the corresponding conditions read out from the memory 7.

In the case where data representing the reflectivity of the disk is stored in the memory 7, the following operation can be carried out according to the embodiment of FIG. 4, wherein like reference numerals of FIG. 2 represent like components.

For example when the disk 31 is set in the disk drive 1, the disk drive 1 sends a detection signal to the control circuit 3. In response to the detection signal, the control circuit 3 sends a control signal to the drive 1 to turn on a focusing servo loop. The control circuit 3 also controls a pickup 36 such that it moves to a non-information recording portion of the disk if the pickup is located in an information recording portion of the disk. The non-information recording portion can be located at any suitable track on the disk, as long as that track has no recorded information. For example the non-information recording portion may be a mirror-surface portion provided inside of the control area 33 or it may be located outside of the user's area 35. Of course, the non-information recording portion may be provided at a certain location within the control area 33, the check area 34, or the user's area 35, as long at that certain location has no recorded information. In the case where the pre-groove (pre-track) for guiding the motion of the pickup has been formed in advance the pre-groove may be used as a non-information recording portion as long as the pre-groove has no recorded information. In other words, the non-information recording portion can be provided at any place on the disk where no RF signal is to be reproduced.

When the pickup 36 radiates laser light onto the non-information recording portion, the mean level, or mean light quantity, of reflected light is detected so that a corresponding signal is sent to the control circuit 3. The control circuit 3 calculates the reflectivity of the disk 31 by comparing the power of a light source 37 with the output of a light-receiving element 38 in the pickup.

After the reflectivity of the disk is determined, the control circuit 3 sets the operation mode of the system to reproduction. In addition, the control circuit 3 moves the pickup to the position of the control area 33 so that data recorded on the control track can be reproduced. The reproductive signal fed from the pickup is decoded by the decoder 9.

During the production of disks (prior to delivery of disks to users), an identification signal is recorded on a control track of each disk corresponding to the reflectivity of the non-information recording portion which is measured in the same manner as described above. The control circuit 3 reads the reflectivity predetermined at the time of production from the memory 7 corresponding to the decoded identification signal, and compares it with the currently measured reflectivity of the disk. If the reflectivity has been considerably lowered because of, for the passage of time, or if the rate of the reflectivity measured at the time of production compared to the currently measured reflectivity is less than a predetermined value, the control circuit 3 instructs the indicating or display unit 5, through the D/A conversion circuit 4, to make a predetermined indication or alarm. The indication may be carried-out in stages corresponding to the degree of lowering of reflectivity. For example, the indication may be separated into three stages, that is, a first stage in which the user'should "back up" the user's data to another disk, a second stage in which data cannot be secured without backing up, and a third stage in which it is impossible to use the disk.

Although the aforementioned embodiments of the invention have been described where data of the type of disk, the light intensity and the reflectivity of disk are stored in the memory 7, other data or information can be stored in the memory. For example the following additional information may be stored in memory:

(1) Modulating Method and Error Correction Coding Method in user's area (Encoder/decoder 2)
  (a) Code for mark-length modulation, inter-mark modulation, or the like;
  (b) Code for MM modulation 8-10 modulation 2-7 modulation, 4-15 modulation or the like;
  (c) Long-distance code or code for product coding method or the like.
(2) Physical Formation in Each Side of the Disk
  (a) Number of tracks per side;
  (b) Number of sectors per track (512, 1024, etc.):
  (c) Number of bytes per section (32, 16, etc.).
(3) Rotation of Disk
  (a) Code for CAV, CLV, M-CAV (disk rotational frequency is constant, and clock frequency in partitioned area gradually increases outwards), or code for M-CLV (CAV in first and second areas, and CLV in intermediate areas);
  (b) Rotational frequency and linear speed.
(4) Direction of Change of Reflectivity in Recording Change from L (non-recording state) to H (recording state). or change from H (non-recording state) to L (recording state).
(5) Data of Photomagnetic Disk
  (a) Intensity of bias magnetic field in recording;
  (b) Intensity of bias magnetic field in erasing;
  (c) Intensity and duration of light in erasing.
(6) Data of Phase-Change Disk
  (a) Intensity and duration of erasing pulse (profile).
(7) Data peculiar to Disk
  (a) Name of maker;
  (b) Date of production;
  (c) Usable drive type (the data are not always necessary if the data are recorded in the check area).
(8) Polarity of Track
  (a) Code for land or groove.
(9) Presence of Recording Surface
  (a) Code for single-sided disk or double-sided disk.
(10) Tracking Servo Method
  (a) Continuous sample hold or intermittent sample hold (by a predetermined number per one turn).

The plurality of data or operating conditions to be established correspond to the identification signal recorded on the disk and are stored in the memory 7. Accordingly, when an identification signal is read, all the numerical values of the disk type, the light intensity during recording, the light intensity during reproduction, the light intensity during erasing, the disk reflectivity and the like, are uniquely specified corresponding to the identification signal. In other words, specific numerical values showing these conditions are stored in the memory 7, but the identification signal itself does not contain specific numerical values, rather the identification signal is nothing but a number or symbol used for selecting conditions, as shown in Table I.

TABLE I

| ID signal | Disk type | Intensity | | | Reflectivity |
|---|---|---|---|---|---|
| | | Write | Read | Erase | |
| 1 | $D_1$ | $R_1$ | $P_1$ | $E_1$ | $F_1$ .. |

TABLE I-continued

| ID signal | Disk type | Intensity Write | Intensity Read | Intensity Erase | Reflectivity |
|---|---|---|---|---|---|
| 2 | $D_2$ | $R_2$ | $P_2$ | $E_2$ | $F_2$ .. |
| 3 | $D_3$ | $R_3$ | $P_3$ | $E_3$ | $F_3$ .. |
| 4 | $D_4$ | $R_4$ | $P_4$ | $E_4$ | $F_4$ .. |
| . | . | . | . | . | . |

As described above, the disk recording/reproducing system according to the present invention is designed such that an identification signal which is previously recorded on a control track of each disk is read out so that a plurality of operating conditions, corresponding to the identification signal, are read out from a table in memory. These operating conditions represent the proper operating conditions for that particular disk (as identified by the identification signal). Accordingly, different types of disks (including the same type of disks but having different operating conditions) can be easily established by a single recording/reproducing unit.

What is claimed is:

1. A recording/reproducing system for a plurality of different types of disks, each of the disks having recorded thereon one of a plurality of identification signals which uniquely identifies one of the plurality of different types of disks, the system comprising:

drive means for driving a disk so as to read the recorded identification signal, said drive means including means for supplying the read identification signal;

a control circuit, connected to said drive means, for receiving the identification signal;

memory means, connected to said control circuit, for storing a plurality of operating conditions for said drive means, said plurality of operating conditions being stored in said memory means such that each of the different types of disks has a corresponding set of operating conditions, and each of said set of operating conditions being addressed in said memory means by a different one of the identification signals, said control circuit being operable, in response to receiving the identification signal, for reading from said memory means, that set of operating conditions corresponding to the identified type of disk, and for controlling said drive means according to the read set of operating conditions; and input means for supplying instructions to said control circuit, each of the instructions representing a different mode of operation of said drive means, said control circuit operable for controlling the system according to the mode of operation instruction supplied by said input means after controlling said drive means according to said read set of operating conditions.

2. The recording/reproducing system according to claim 11, wherein said plurality of operating conditions are stored in said memory means in a table form.

3. The recording/reproducing system according to claim 2, wherein said different modes of operation includes terminating said system, reproducing information from the disk, recording information onto the disk, and erasing information recorded on the disk.

4. The recording/reproducing system according to claim 1, further comprising display means connected to said control circuit for displaying information, and wherein said control circuit includes means for determining, according to the identified type of disk, whether an instruction supplied by said input means can be performed by said drive means, said control circuit supplying, in response to an output of said determining means, either a control signal to said drive means, or an error signal to said display means, said display means being responsive to the error signal for displaying information representing that the inputted instruction cannot be performed with the identified type of disk.

5. The recording/reproducing system according to claim 4, further comprising a conversion circuit for receiving a signal to be recorded on the disk, and for supplying a signal to be reproduced from the disk.

6. The recording/reproducing system according to claim 5, further comprising an encoder/decoder circuit, connected to said control circuit and to said drive means, for encoding the signal to be recorded on the disk, and for decoding the signal to be reproduced form the disk, and for decoding the identification signal.

7. The recording/reproducing system according to claim 6, further comprising a decoder circuit connected to said control circuit and to said drive means, for decoding the identification signal.

8. The recording/reproducing system according to claim 4, further comprising means for calculating a reflection density of the disk.

9. The recording/reproducing system according to claim 8, wherein said means for calculating the reflection density of the disk includes a pickup device connected to said drive means, said pickup device including a light source and a light receiving element.

10. The recording/reproducing element according to claim 8, wherein said set of operating conditions for the identified disk includes a reference reflection density value, and wherein said control circuit is operable for comparing the calculated reflection density of the disk with the reference reflection density value, and for generating a signal representing the result of the comparison.

* * * * *